(12) United States Patent
Ankolekar et al.

(10) Patent No.: US 9,275,542 B2
(45) Date of Patent: Mar. 1, 2016

(54) LOCATION-INDEXED AUDIO CONTENT

(75) Inventors: Anupriya Ankolekar, Sunnyvale, CA (US); Bernardo Huberman, Palo Alto, CA (US); Thomas E. Sandholm, Mountain View, CA (US); W. Alex Vorbau, Los Altos, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 451 days.

(21) Appl. No.: 13/812,123

(22) PCT Filed: Jul. 30, 2010

(86) PCT No.: PCT/US2010/043979
§ 371 (c)(1),
(2), (4) Date: Jan. 24, 2013

(87) PCT Pub. No.: WO2012/015434
PCT Pub. Date: Feb. 2, 2012

(65) Prior Publication Data
US 2013/0121503 A1    May 16, 2013

(51) Int. Cl.
*H04B 3/00* (2006.01)
*G08C 19/00* (2006.01)
(Continued)

(52) U.S. Cl.
CPC ............. *G08C 19/00* (2013.01); *H04W 4/02* (2013.01); *H04W 4/18* (2013.01); *H04W 4/185* (2013.01); *H04W 4/206* (2013.01)

(58) Field of Classification Search
CPC ........... H04W 4/02; H04W 4/00; H04W 4/18; H04W 4/185; H04W 4/206; G06F 17/30761; H04N 21/258; H04N 21/91; H04N 21/00; H04H 60/06; G08C 19/00; H04L 29/08657
USPC ............ 381/77; 707/758, 319, 803, 724, 737, 707/740, 732, 754, 916, 919; 715/747, 716; 705/319, 14.55; 725/46, 45; 700/94; 455/456.3

See application file for complete search history.

(56) References Cited

U.S. PATENT DOCUMENTS

| 2003/0023489 A1* | 1/2003 | McGuire et al. ....... G06Q 30/02 705/14.55 |
| 2005/0064852 A1* | 3/2005 | Baldursson ......... G06F 17/3089 455/414.2 |

(Continued)

FOREIGN PATENT DOCUMENTS

| KR | 20090000232 A | 1/2009 |
| WO | WO-03001823 A1 | 1/2003 |

(Continued)

OTHER PUBLICATIONS

PCT Search Report—Application No. PCT/US2010/043979 dated Apr. 29, 2011—9 pages.

*Primary Examiner* — Vivian Chin
*Assistant Examiner* — Ammar Hamid
(74) *Attorney, Agent, or Firm* — Hewlett Packard Enterprise Patent Department

(57) ABSTRACT

Associations between pieces of electronic audio content and geographic locations are stored. An indication of a present link between an electronic device and a particular geographic location is received. A particular piece of electronic audio content is identified as being related to the particular geographic location. The identified piece of electronic audio content then is made available to the electronic device.

15 Claims, 6 Drawing Sheets

(51) Int. Cl.
*H04W 4/02* (2009.01)
*H04W 4/18* (2009.01)
*G06F 7/00* (2006.01)
*H04W 4/20* (2009.01)

(56) References Cited

U.S. PATENT DOCUMENTS

| | | |
|---|---|---|
| 2006/0161952 A1 | 7/2006 | Herz et al. |
| 2008/0070588 A1 | 3/2008 | Morin |
| 2008/0141133 A1 | 6/2008 | Yamamoto et al. |
| 2009/0069911 A1 | 3/2009 | Stefik |
| 2009/0164429 A1 | 6/2009 | Svendsen et al. |
| 2009/0187944 A1 | 7/2009 | White et al. |
| 2010/0030772 A1 | 2/2010 | Zilca et al. |
| 2010/0042932 A1 | 2/2010 | Lehtiniemi et al. |
| 2010/0138433 A1* | 6/2010 | Holm et al. ....... G06F 17/30867 707/758 |

FOREIGN PATENT DOCUMENTS

| WO | WO 03001823 A1 * | 12/2003 |
|---|---|---|
| WO | WO-2008051468 A1 | 5/2008 |

* cited by examiner

LOCATION-INDEXED AUDIO CONTENT

FIELD

This disclosure is related to location-indexed audio content.

BACKGROUND

Many portable electronic devices (e.g., portable media players, mobile phones, smartphones, personal digital assistants, and laptop, tablet, and netbook computers) and other computing systems (e.g., desktop computers) are capable of receiving audio files from other devices and, thereafter, rendering the received audio files to generate audible sound.

SUMMARY

In one general aspect, associations between individual pieces of electronic audio content and corresponding geographic locations are stored. In addition, a record of an assignment of each of the individual pieces of electronic audio content to at least one collection of electronic audio content from among multiple different collections of electronic audio content also is stored. A request to subscribe to one or more specific ones of the collections of electronic audio content is received. The request to subscribe to the one or more specific collections of electronic audio content is associated with an electronic device. An indication of a present link between the electronic device and a particular geographic location also is received. Based on the stored associations between the individual pieces of electronic audio content and the stored records of the assignments of the individual pieces of electronic audio content to the collections of electronic audio content, a particular piece of electronic audio content is identified as being assigned to one of the one or more specific collections of electronic audio content and as being related to the particular geographic location. The identified piece of electronic audio content then is made available to the electronic device.

Implementations may include one or more of the following features. For example, an indication that the electronic device presently is accessing electronic content that is relevant to the particular geographic location such as one or more images of the particular geographic location, perhaps available from a web site, may be received. Alternatively, an indication that the electronic device presently is located at the geographic location, such as geolocation information provided by the electronic device, may be received.

In some implementations, indications of corresponding geographic locations with which at feast some of the pieces of electronic audio content are associated may be received from other electronic devices and, thereafter, stored. One or more of these received indications may include geolocation information provided by an electronic device that specifies a corresponding geographic location at which the electronic device was located when the electronic device accessed an individual one of the pieces of electronic audio content. Furthermore, a piece of electronic audio content recorded by a particular electronic device may be received and stored, and geolocation information provided by the particular electronic device specifying a corresponding geographic location at which the particular electronic device was located when the particular other electronic device recorded the specific piece of electronic audio content may be received.

Additionally or alternatively, a record of an assignment to a collection of electronic audio content that is related to a first user identifier corresponding to a first user may be stored, and a request to subscribe to the collection of electronic audio content that is related to the first user identifier may be received. This request may be related to a second user identifier. It then may be determined that the second user identifier is related to the first user identifier in a social network, and, based on having determined that the second user identifier is related to the first user identified in the social network, the request to subscribe to the collection of electronic audio content that is related to the first user identifier may be granted. Thereafter, a particular piece of electronic audio content may be identified as being assigned to the collection of electronic audio content that is related to the first user identifier and being related to the particular geographic location. In addition, this piece of electronic audio content may be made available to the electronic device.

In some implementations, an identified piece of electronic audio content may be streamed to the electronic device. In addition, while the identified piece of the electronic audio content is being streamed to the electronic device, an indication of a new link between the electronic device and a new geographic location may be received. Based on the stored associations between the individual pieces of electronic audio content and the stored records of the assignments of the individual pieces of electronic audio content to the collections of electronic audio content, a new piece of electronic audio content may be identified as being assigned to one of the one or more specific collections of electronic audio content and being related to the new geographic location. The streaming of the identified piece of the electronic audio content to the electronic device may be terminated, and a streaming of the new piece of electronic audio content to the electronic device may be initiated.

In some implementations, a request to subscribe to two or more specific collections of electronic audio content may be received, and a set of pieces of electronic audio content that are related to the particular geographic location and assigned to at least one of the two or more specie collections of electronic audio content may be identified. Ranking heuristics then may be applied to the set of pieces of electronic audio content, and a particular piece of electronic audio content may be selected based on results of applying the ranking heuristics to the set of pieces of electronic audio content.

According to another general aspect, information that records associations between geographic locations and electronic audio files is stored. In addition, a determination is made that a particular piece of electronic content being accessed by an electronic device is associated with a particular geographic location. Based on the stored information that records associations between geographic locations and electronic audio files, an audio file is identified as being associated with the particular geographic location, and the electronic audio file identified as being associated with the particular geographic location is made available at the electronic device while the particular piece of electronic content is being accessed by the electronic device.

The various aspects, implementations, and features disclosed may be implemented using, for example, one or more of a method; an apparatus; a system; an apparatus, system, tool, or processing device for performing a method; a computer program or other set of instructions stored on a tangible computer-readable storage medium; and art apparatus that includes a program or a set of instructions stored on a computer-readable storage medium.

DETAILED DESCRIPTION

A hosted server that is accessible to electronic devices over a wired or wireless network connection enables users of the electronic devices to designate audio fragments (e.g., songs or other audio files) as being related to or otherwise associated with particular geographic locations. These crowd-sourced relationships between individual audio fragments and different geographic locations are stored in a data store by the hosted service such that the audio fragments are indexed by location(s). In addition, the hosted service is configured to determine a physical or virtual location of an individual electronic device, to identify one or more of the location-indexed audio fragments as having been designated by users as being related to the determined location, and to deliver the identified audio fragments to the electronic device for playback. As such, the hosted service provides the electronic device with one or more audio fragments that are perceived as being highly relevant to the current content of the electronic device.

For example, as a user of a mobile electronic device wanders the historic streets of the French Quarter in New Orleans, the service may determine that the physical location of the mobile device is New Orleans, and, consequently, the service may deliver songs to the mobile electronic device that have been chosen by others as being most fitting for New Orleans, e.g., harmonious jazz riffs punctuated with blue notes and syncopation. Similarly, as a user of a desktop computer uses the desktop computer to browse a collection of photographs from a recent New Orleans vacation, the service may determine that the virtual location of the desktop computer is New Orleans, and, consequently, the service may deliver a stream of classic jazz songs to the desktop computer for playback while the user browses the collection of photographs, enhancing the user's photograph-viewing experience and helping to recall the time spent in New Orleans. In this manner, the songs selected and delivered to the mobile device by the service may serve as an emotional overlay for the user's physical or virtual location, adding a context-sensitive and dynamic soundtrack to the user's present experience.

Figure 1A:
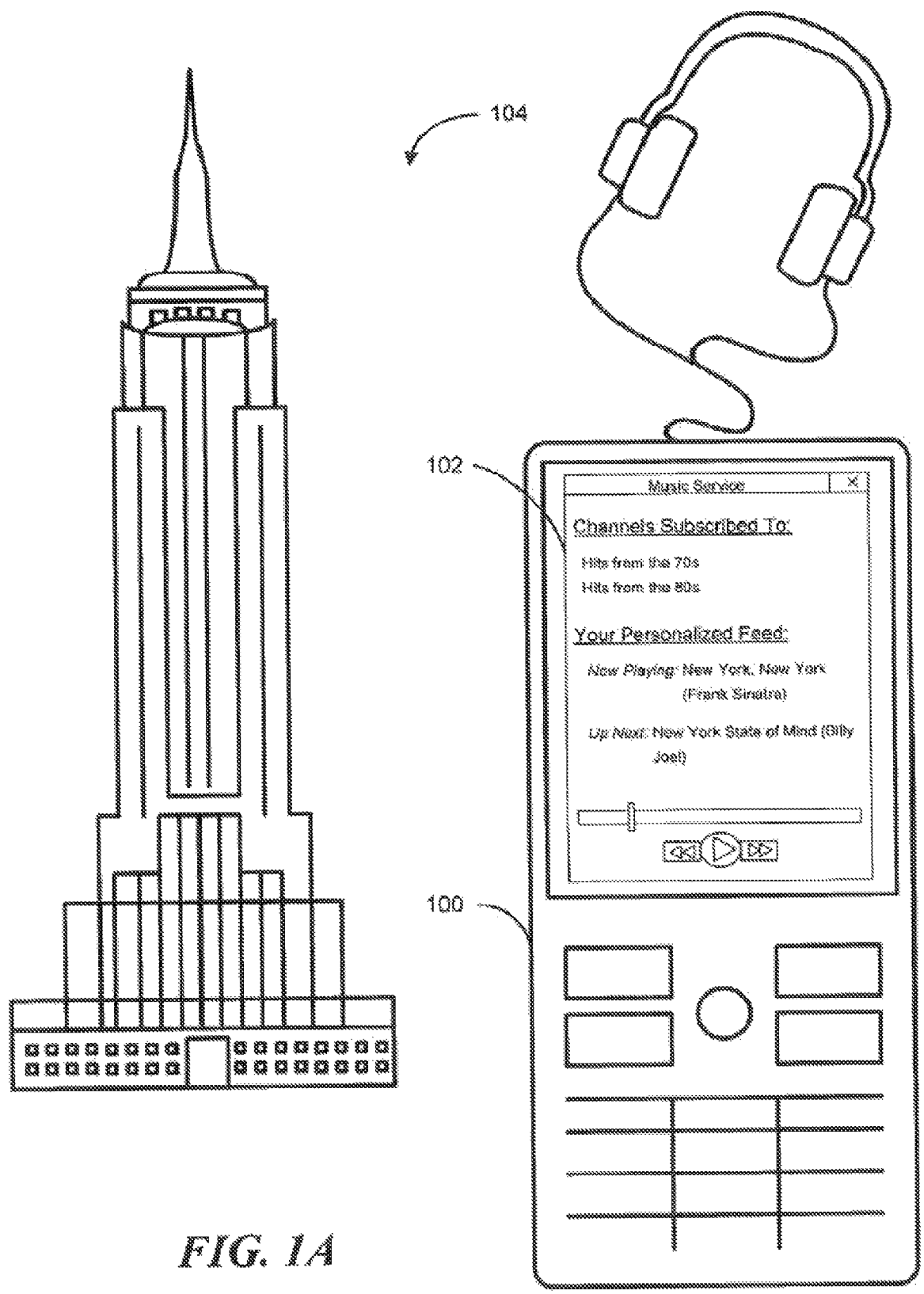
FIGS. 1A-1B are block diagrams of an example of a portable electronic device running an example of an application that interfaces with an example of a hosted music service that provides access to location-indexed audio content.
Figure 1B:
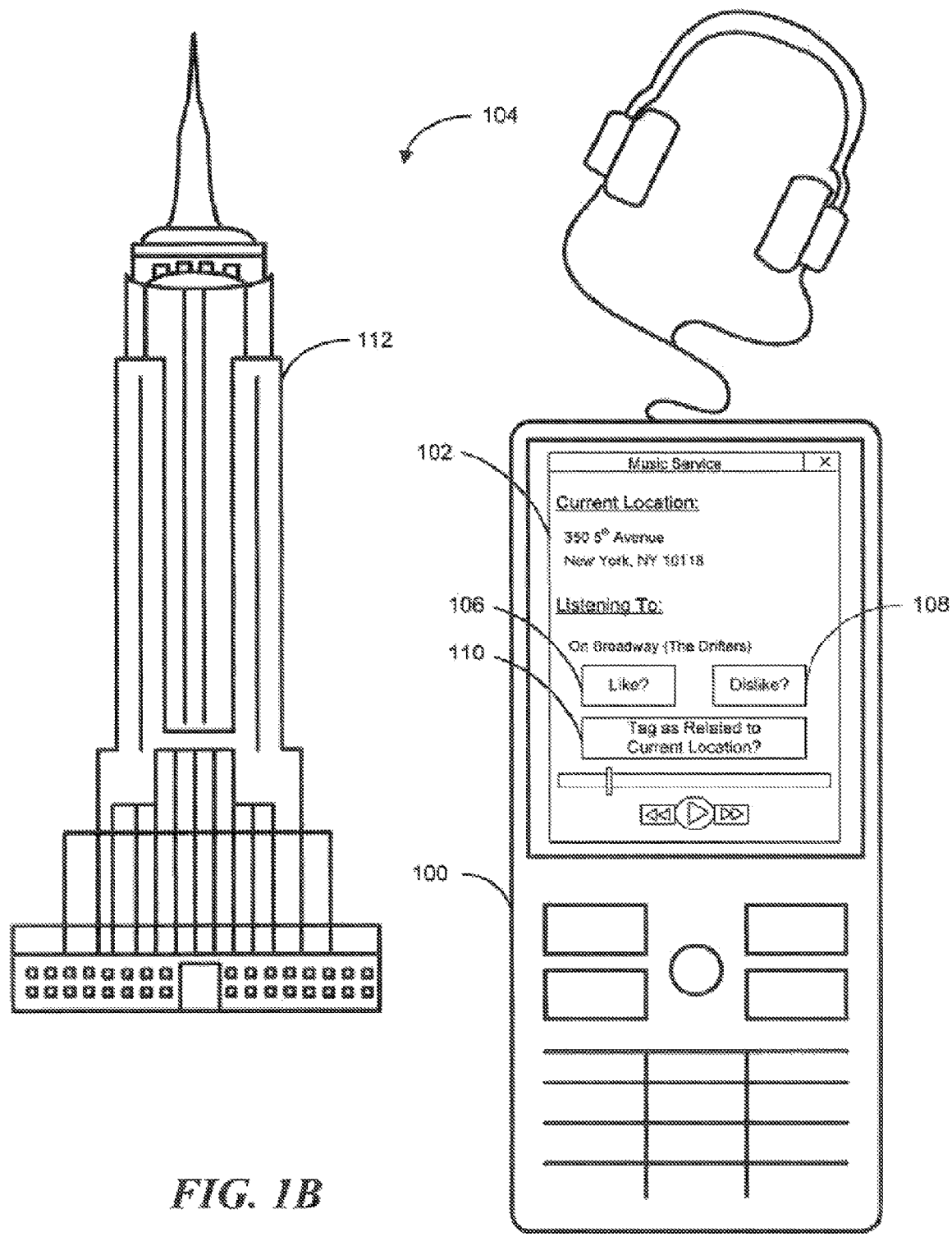

FIGS. 1A-1B are block diagrams of an example of a portable electronic device 100 running an example of an application that interfaces with an example of a hosted music service (not shown) that provides access to location-indexed audio content. Specifically, the portable electronic device 100 is configured to connect to the Internet over a wireless network connection and is executing a client application that provides an interface, including the graphical user interface (GUI) 102 rendered on the portable electronic device 100, to a hosted music service that is accessible to the portable electronic device 100 over the Internet.

The hosted music service maintains or otherwise has access to a library of songs that the hosted music service classifies as belonging to one or more different collections of songs referred to as channels. These channels may be defined, for example, based on genre, artist/composer, and/or time period, among other categories. The hosted music service also is configured to enable users to tag individual songs as being related to one or more geographic locations and to index individual songs within the library of songs based on the geographic locations to which users of the hosted music service have identified the songs as being related.

The hosted music service is configured to transmit songs from the library of songs maintained by or accessible to the hosted music service to electronic devices for playback at the electronic devices based on the physical or virtual locations of the electronic devices. Specifically, the hosted music service enables a user to subscribe to one or more different channels offered by the hosted music service at an electronic device and, thereafter, transmits songs to the electronic device that have been classified as belonging to the channel(s) to which the user subscribed and that other users have designated as being related to the geographic location to which the physical or virtual location of the electronic device corresponds.

The GUI 102 rendered on the portable electronic device 100 facilitates interaction between a user of the electronic device 100 and the hosted music service through manipulation of the GUI 102 via the portable electronic device 100. For example, the GUI 102 enables the user of the electronic device 100 to select one or more channels offered by the hosted music service to which to subscribe. In addition, the GUI 102 presents information about the songs (e.g., title, artist, etc) selected for and transmitted to the portable electronic device 100 by the hosted music service and provides the user with controls (e.g., play, fast forward/skip, and rewind/repeat) for controlling the playback of the songs, selected for and transmitted, to the portable electronic device 100.

The portable electronic device 100 is configured to determine its location, which enables the application executing on the portable electronic device to transmit information indicative of the location of the portable electronic device 100 to the hosted music service. In some implementations, the portable electronic device 100 may be determine its locations and the application executing on the portable electrode device 100 may transmit information indicative of the location of the portable electronic device 100 to the hosted music service periodically. Additionally or alternatively, the portable electronic device 100 may determine its location and the application executing on the portable electronic device 100 may transmit information indicative of the location of the portable electronic device to the hosted music service in response to one or more triggering events. In any case, the hosted music service is able to use the location information received from the portable electronic device 100 to determine that the portable electronic device 100 presently is linked to a particular physical location, which informs the hosted music service's selection of songs to transmit to the portable electronic device 100.

In some implementations, the portable electronic device 100 may include a global positioning system (GPS) receiver that is configured to receive broadcast signals from GPS satellites, and the portable electronic device 100 may be configured to calculate its latitude, longitude, and altitude, as well as the current time, based on the signals it receives from the GPS satellites. In such implementations, after the portable electronic device 100 has calculated its latitude and longitude coordinates, the application executing on the portable electronic device 100 may transmit the latitude and longitude coordinates of the portable electronic device 100 (or some other information that is indicative of the location of the portable electronic device) to the hosted music service.

As illustrated in FIG. 1A, the user of the portable electronic device 100 is walking the streets of New York City 104. In addition, the user of the portable electronic device 100 has manipulated the GUI 102 to interface with the hosted music service to request to subscribe to two channels offered by the hosted music service, "Hits from the 70s" and "Hits from the 80s," at the portable electronic device 100. Due to the fact that the user of the portable electronic device 100 has subscribed only to the "Hits from the 70s" and the "Hits from the 80s" channel at the portable electronic device 100, when the hosted music service selects songs to transmit to the portable electronic device 100 for playback at the portable electronic device 100, the hosted music service limits the songs in the library from which it selects only to songs identified as belonging to the "Hits from the 70s" and the "Hits from the 80s" channels. Moreover, in selecting songs from these two channels, the hosted music service considers the physical location of the portable electronic device 100 and selects songs that other users have identified as being related to the geographic location to which the physical location of the portable electronic device 100 corresponds.

For example, as illustrated in FIG. 1A, the hosted music service has selected two songs for playback at the portable electronic device 100, New York, New York, by Frank Sinatra, and New York State of Mind, by Billy Joel. New York, New York was a hit song in the 1980s and thus belongs to the "Hits from the 80s" channel, and New York State of Mind was a hit song in the 1970s and thus belongs to the "Hits from the 1970s" channel. Moreover, other users of the hosted music service have designated both New York, New York and New York State of Mind as being related to New York City. Therefore, the hosted music service selected these two songs for the portable electronic device 100 based on the fact that the portable electronic device 100 presently is located in New York City and is subscribing to the "Hits from the 70s" and the "Hits from the 80s channels."

In some implementations, the application executing on the portable electronic device 100 enables the user of the portable electronic device 100 to provide feedback to the hosted music service about songs that the user of the portable electronic device 100 is listening to using the portable electronic device 100. For example, the application executing on the portable electronic device 100 may enable the user of the portable electronic device 100 to designate a song that the user is listening to using the portable electronic device 100 as being related to a particular geographic location (e.g., the geographic location of the portable electronic device 100 at the time that the user is listening to the song). Additionally or alternatively, the portable electronic device 100 may enable the user of the portable electronic device 100 to rate or otherwise provide preference information about a song that the user is listening to using the portable electronic device 100 to the hosted music service. The hosted music service then may take any such location and/or preference information for songs received from the portable electronic device 100 into account in its future selection of songs for the portable electronic device 100 and/or other electronic user devices.

For example, referring to FIG. 1B, the GUI 102 may provide a selectable "Like" button 106 and a selectable "Dislike" button 108 that enable the user of the portable electronic device 100 to provide subjective feedback to the hosted music service about a song that the user is listening to using the portable electronic device 100, which, in this case, is On Broadway, by the Drifters. Specifically, by selecting the "Like" button 106, the user of the portable electronic device 100 can cause the portable electronic device 100 to transmit a message to the hosted music service indicating that the user enjoys the song that the user is listening to using the portable electronic device 100. Similarly, by selecting the "Dislike" button 106, the user of the portable electronic device 100 can cause the portable electronic device 100 to transmit a message to the hosted music service indicating that the user is not enjoying the song that the user is listening to using the portable electronic device 100.

In addition to receiving explicit subjective feedback from the user of the electronic portable device 100 about a song that the user is listening to using the portable electronic device 100, the boated music service may monitor the user's listening activity and make certain inferences about the users preferences for and against a song that the user is listening to using the portable electronic device 100. For example, the portable electronic device 100 may transmit information to the hosted music service about whether the user of the portable electronic device 100 repeated a song or skipped a song that the user was listening to using the portable electronic device. The hosted music service then may infer that the user favors a song that the user has repeated one or more times and the hosted music service may infer that the user disfavors a song that the user skipped.

The hosted music service may record the explicit and inferred feedback received from the portable electronic device 100 and use this feedback when selecting songs for the portable electronic device 100 and/or other electronic user devices in the future. For example, the hosted music service may calculate popularity scores for individual songs within the library of songs available to the hosted music service. When the hosted music service receives feedback indicating that a user favored an individual song, the hosted music service may increase the popularity score for the song. In contrast, when the hosted music service receives feedback indicating that a user disfavored an individual song, the hosted music service may decrease the popularity score for the song. Then, when the hosted music service is selecting songs for individual electronic user devices, the hosted music service may select songs having relatively high popularity scores before selecting songs having relatively low popularity scores.

The GUI 102 also includes a selectable geolocation tag button 110 that enables a user of the portable electronic device 100 to instruct the hosted music service to tag the song that the user is listening to as being related to the current physical location of the portable electronic device 100. As discussed previously, the portable electronic device 100 is configured to determine its location. In some implementations, the GUI 102 may surface information about the current location of the portable electronic device 100. For example, as illustrated in FIG. 1B, the GUI 102 indicates that the portable electronic device 100 is located at 350 $5^{th}$ Avenue in New York City, which is the address of the Empire State Building 112. By selecting the geolocation tag button 110, the user can cause the portable electronic device 100 to transmit a message to the hosted music service indicating that the song that the user currently is listening to using the portable electronic device 100, which, in this case, is On Broadway, by The Drifters, should be tagged as being related to the current location of the portable electronic device 100.

The hosted music service stores the relationships between geographic locations and individual songs received from the portable electronic device 100 and other electronic user devices enabling the hosted music service to build and update a location-based index for the songs available to the hosted music service from the song library. As users continue to listen to music while on the go, tagging different songs as being related to different geographic locations, the hosted music service is able to build a more robust and refined location-based index of the songs. In this manner, the hosted music service is able to construct a crowd-sourced location index for the songs available to the hosted music service from the song library.

Figure 2:
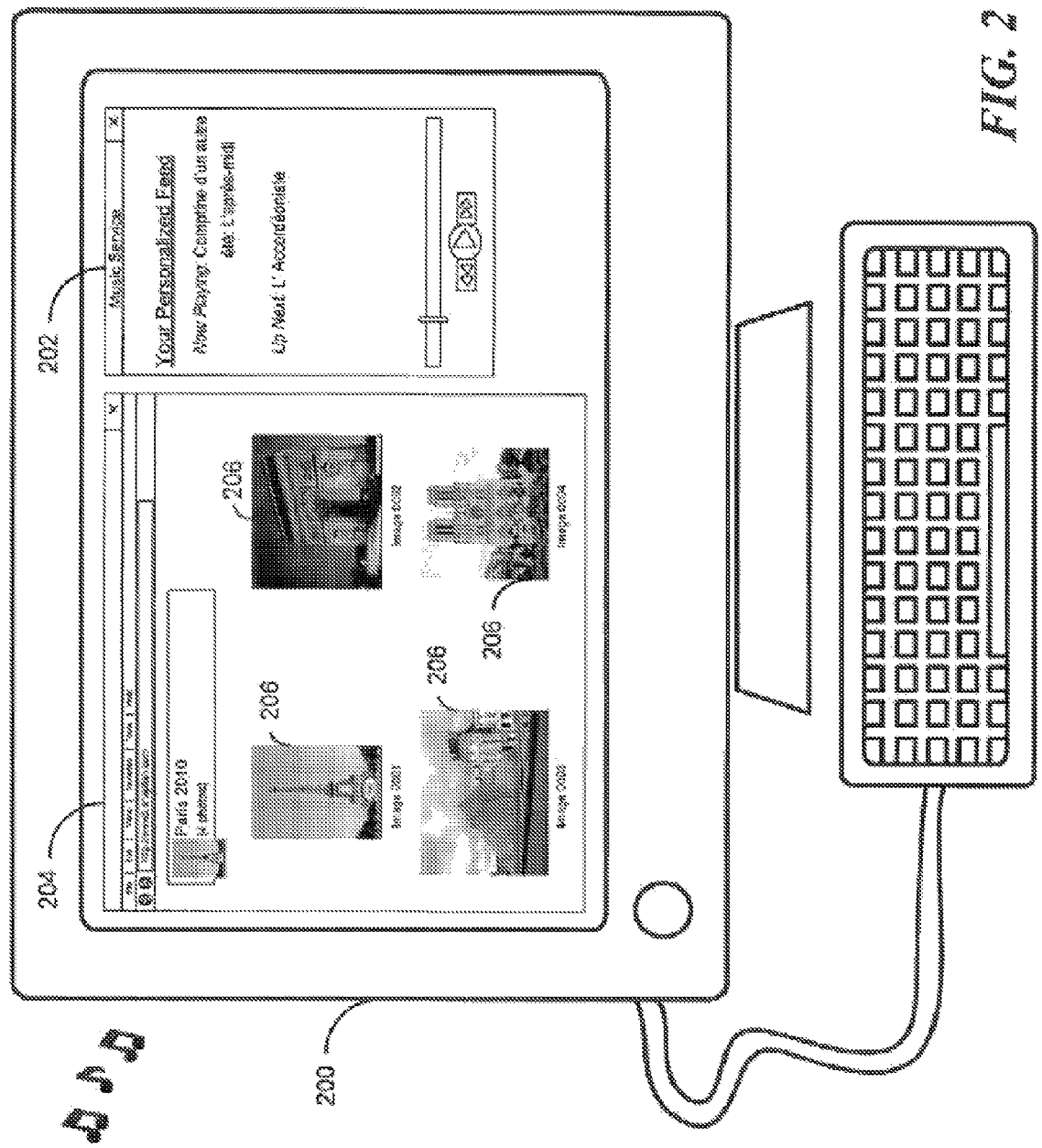
FIG. 2 is a block diagram of an example of a desktop computer running an example of an application that interfaces with an example of a hosted music service that provides access to location-indexed audio content.

FIG. 2 is a block diagram of an example of a desktop computer 200 running an example of an application that interfaces with an example of a hosted music service (not shown) that provides access to location-indexed audio content. Specifically, the desktop computer 200 is configured to connect to the Internet over a wired or wireless network connection and is executing a client application that provides an interface, including the GUI 202 rendered on the desktop computer 200, to a hosted music service that is accessible to the desktop computer 200 over the Internet.

The hosted music service is configured to transmit songs from the library of songs maintained by or accessible to the hosted music service to electronic devices for playback at the electronic devices based on the physical or virtual locations of the electronic devices. Specifically, the hosted music service transmits songs to the electronic devices that other users have designated as being related to the geographic location to which the physical or virtual location of the electronic device corresponds.

The GUI 202 rendered on the desktop computer 200 facilitates interaction between a user of the desktop computer 200 and the hosted music service through manipulation of the GUI 202 via the desktop computer 200. For example, the GUI 202 presents information about the songs selected for and transmitted to the desktop computer 200 by the hosted music service and provides the user with controls (e.g., play, fast forward/skip, and rewind/repeat) for controlling the playback of the songs selected for and transmitted to the desktop computer 200.

The application executing on the desktop computer 200 that interfaces with the hosted music service is configured to determine a present virtual location for the desktop computer 200 based on the current contextual activity of the desktop computer 200. That is to say, the application executing on the desktop computer is configured to determine a geographic location to which the desktop computer 200 presently is linked based on the current contextual activity of the desktop computer 200. Many techniques may be employed to determine a present virtual location of the desktop computer 200 based on the current contextual activity of the desktop computer 200. In some implementations, the content that currently is being accessed by the desktop computer 200 may be analyzed and a virtual location for the desktop computer 200 may be determined based on the content that the desktop computer 200 is accessing.

In one example, the desktop computer 200 may be running a web browser and using the web browser to access content made available by a content provider over the Internet. In such cases, the content that the desktop computer 200 is accessing using the web browser may be analyzed and a virtual location for the desktop computer 200 may be determined based on the content that the desktop computer 200 is accessing using the web browser. In some cases, metadata may be embedded within the content that the desktop computer 200 is accessing using the web browser that specifies a geographic location with which the content should be associated. For example, a web page for an Italian restaurant specializing in Sicilian cuisine may include metadata specifying that the web page should be associated with Sicily. In such cases, the geographic location specified within the metadata embedded in the web page may be determined to be the appropriate virtual location for the desktop computer 200. In other cases, text and/or images included within the content that the desktop computer 200 is accessing using the web browser may be analyzed, and the virtual location for the desktop computer 200 may be determined based on the text and/or images. For example, a web page may include text about Athens and/or photographs of the Acropolis and the Parthenon and analysis of the text and/or photographs may result in Athens being determined to be the appropriate virtual location for the desktop computer 200. In a second example, the desktop computer 200 may be executing or accessing a mapping application that enables exploration of a certain locale. In such cases, the locale that is being explored using the mapping application may be determined to be the appropriate virtual location for the desktop computer 200.

In any case, after the application executing on the desktop computer 200 that interfaces with the hosted music service determines a virtual location for the desktop computer 200 based on the current contextual activity of the desktop computer 200, the application causes the desktop computer 200 to transmit an indication of the determined virtual location for the desktop computer 200 to the hosted music service. The hosted music service then uses the virtual location information received from the desktop computer 200 to inform its selection of songs to transmit to the desktop computer 200.

As illustrated in FIG. 2, the desktop computer 200 is running a web browser that causes a web browser GUI 204 to be displayed at the desktop computer 200 and that enables a user of the desktop computer 200 to access content over the Internet. Specifically, the web browser is enabling the user of the desktop computer 200 to access a photograph sharing and publishing website through which an album of photographs 206 from a recent vacation to Paris is available. As discussed above, the application executing on the desktop computer 200 that interfaces with the hosted music service is configured to determine a present virtual location for the desktop computer 200 based on the current contextual activity of the desktop computer 200. As such, based on the fact that the desktop computer 200 is using the web browser to access photographs of Paris, the application may determine that Paris is the appropriate virtual location for the desktop computer 200 and transmit this virtual location information to the hosted music service.

The hosted music service then considers the virtual location of the desktop computer 200 and selects songs for the desktop computer 200 that other users have identified as being related to the geographic location to which the virtual location of the desktop computer 200 corresponds. For example, as illustrated in FIG. 2, the hosted music service has selected two songs, Comptine d'un autre été: L'aprés-midi and L'Accordéoniste, for playback at the desktop computer 200 based on Paris having been determined to be the virtual location of the desktop computer 200. As a result, as the user of the desktop computer 200 browses the photographs 206 of the user's Parisian vacation, they will be accompanied by the strains of accordion music, allowing the user to more vividly recall all of the sights and sounds of the time spent in Paris.

Although the example of the location-based selection of music for an electronic device based on a virtual location of the electronic device described above in connection with FIG. 2 is described generally in the context of a desktop computer, it will be appreciated that this example is equally applicable to many other types of electronic devices (e.g., portable media players, mobile phones, smartphones, personal digital assistants, and laptop, tablet, and netbook computers) besides desktop computers and that the location-based selection of music based on a virtual location may be performed just as well for such other electronic devices.

Figure 3:
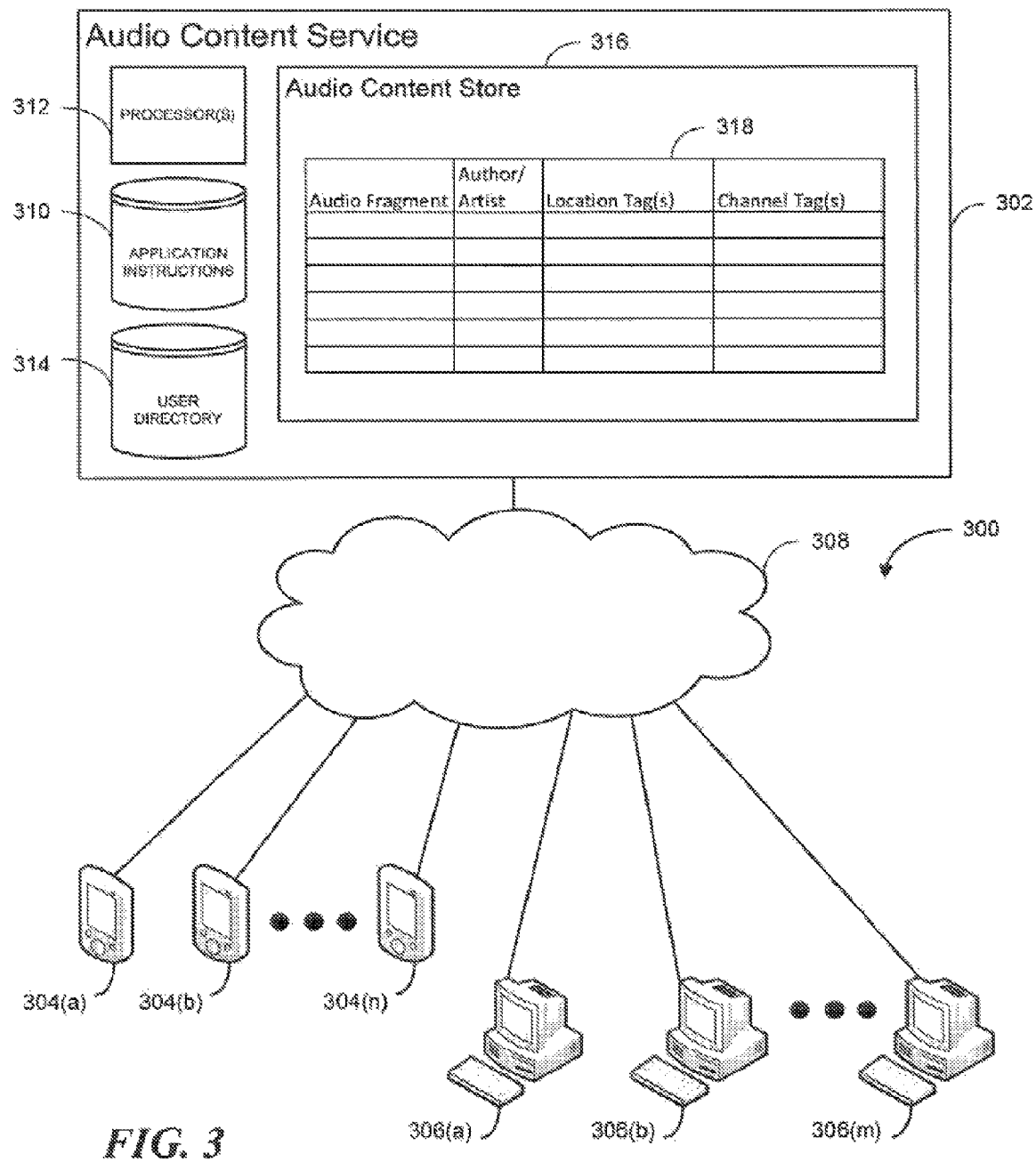
FIG. 3 is a block diagram of an example of a communications system that provides access to location-indexed audio content.

FIG. 3 is a block diagram of an example of a communications system 300 that provides access to location-indexed audio content. For illustrative purposes, several elements illustrated in FIG. 3 and described below are represented as monolithic entities. However, these elements each may include and/or be implemented on numerous interconnected computing devices and other components that are designed to perform a set of specified operations and that are located proximally to one another or that are geographically displaced from one another.

As must rated in FIG. 3, hosted audio content service 302 is accessible to portable electronic devices 304(a)-304(n) end a number of desktop computers 306(a)-306(m) over a network 308.

Portable electronic devices 304(a)-304(n) may be any of a number of different types of portable electronic devices including, for example, portable media players, mobile phones, smartphones, personal digital assistants, and laptop, tablet, and netbook computers. Similarly, desktop computers 308(a)-306(m) also may be any of a number of different types of desktop computers including personal computers, special purpose computers, general purpose computers, and/or combinations of special purpose and general purpose computing devices.

Each of the portable electronic devices 304(a)-304(n) and the desktop computers 306(a)-306(m) typically has internal or external storage components for storing data and programs such as an operating system and one or more application programs. Examples of application programs include authoring applications (e.g., word processing programs, database programs, spreadsheet programs, or graphics programs) capable of generating documents or other electronic content; client applications (e.g., e-mail clients) capable of communicating with other computer users, accessing various computer resources, and viewing, creating, or otherwise manipulating electronic content, and browser applications capable of rendering standard internet content and, in some cases, also capable of supporting a web-based e-mail client. In addition, the internal or external storage components for each of the portable electronic devices 304(a)-304(n) and the desktop computers 306(a)-306(m) may store a client application for interfacing with hosted audio content service 302. Alternatively, in some implementations, portable electronic devices 304(a)-304(n) and desktop computers 306(a)-308(m) may interface with hosted audio content service 302 without a specific client application.

Each of the portable electronic devices 304(a)-304(n) and the desktop computers 306(a)-306(n) also typically includes a central processing unit (CPU) for executing instructions stored in storage and/or received from one or more other electronic devices, for example over network 308. Each of the portable electronic devices 304(a)-304(n) and the desktop computers 306(a)-306(m) also usually includes one or more communication devices for sending and receiving data. One example of such communications devices is a modem. Other examples include antennas, transceivers, communications cards, and other network adapters capable of transmitting and receiving data over network 308 through a wired or wireless data pathway.

Hosted audio content service 302 may be implemented using one or more computing devices (e.g., servers) configured to provide a service to one or more client devices (e.g., portable electronic devices 304(a)-304(b) and desktop computers 308(a)-306(m)) connected to hosted audio content service 302 over network 308. The one or more computing devices on which hosted audio content service 302 is implemented may have internal or external storage components storing data and programs such as an operating system and one or more application programs. The one or more application programs may be implemented as instructions that are stored in the storage components and that, when executed, cause the one or more computing devices to provide the features of the hosted audio content service 302 described herein.

Furthermore, the one or more computing devices on which hosted audio content service 302 is implemented each may include one or more processors 312 for executing instructions stored in storage and/or received from one or more other electronic devices, for example over network 308. In addition, these computing devices also typically include network interfaces and communication devices for sending and receiving data.

As illustrated in FIG. 3, hosted audio content service 302 includes a computer memory storage system storing application instructions 310 for providing the functionality made available by hosted audio service 302 as described herein, and one or more processors 312 for executing instructions, for example, application instructions 310 and/or instructions received from one or more other electronic devices.

Hosted audio content service 302 also includes a computer memory storage system storing a user directory 314. User directory 314 may store account-related information for users of the hosted audio content service 302. For example, user directory 314 may store user names, authentication information, and/or user preference information for users of the hosted audio content service 302. Examples of user preference information that may be stored in user directory 314 include user preferences for or against different genres of audio content, user preferences for or against certain authors of audio fragments (e.g., composers and/or artists), and/or user preferences for or against specific audio fragments. In addition, the user preference information stored in user directory 314 also may include indications of social relationships between individual users of the hosted audio content service 302 and/or indications of specific users that individual users of the hosted audio content service 302 have designated as being trusted. For example, the user preference information stored in user directory 314 for an individual user of the audio content service 302 may include information about which other users of the hosted audio content service 302 belong to a social network of the individual user. Furthermore, the user preference information stored in user directory 314 may include indications of preferred and/or disfavored channels offered by the hosted audio content service 302. As will be described in greater detail below, hosted audio content service 302 also includes a computer memory storage system for implementing an audio content store 316.

Network 308 may provide direct or indirect communication links between hosted audio content service 302, portable electronic devices 304(a)-304(n), and desktop computers 306(a)-306(m) irrespective of physical separation between any of such devices. As such, individual ones of hosted audio content service 302, portable electronic devices 304(a)-304(n), and desktop computers 306(a)-306(m) may be located in close geographic proximity to one another or, alternatively, individual ones of hosted audio content service 302, portable electronic devices 304(a)-304(n), and desktop computers 306(a)-306(m) may be distributed across vast geographic distances. Examples of network 308 include the Internet, the World Wide Web, wide area networks (WANs), local area networks (LANs) including wireless LANs (WLANs), analog or digital wired and wireless telephone networks, radio, television, cable, satellite, and/or any other delivery mechanisms for carrying data. In some implementations, one or more of portable electronic devices 304(a)-304(n) and desktop computers 306(a)-306(m) may be connected to network 300 over a wireless connection (e.g., a WLAN based on the IEEE 802.11 standard, a radio frequency abased wireless network, and/or a cellular or mobile telephony network provided by a wireless service provider) made available by a private service provider.

Hosted audio content service 302 is configured to store audio fragments in audio fragment store 316 and to make these audio fragments available to electronic user devices, such as, for example, portable electronic devices 304(a)-304(n) and desktop computers 306(a)-306(m). In connection with storing the individual audio fragments in the audio content store 316, the hosted audio content service 302 also may store metadata related to the individual audio fragments. For example, for each individual audio fragment, the hosted audio content service 302 may store in the audio content store 318 an indication of the author of the audio fragment or the artist that recorded the audio fragment, one or more location tags corresponding to locations that users of the hosted audio content service have designated as being related to the audio fragment, and/or one or more channel tags corresponding to channels offered by the hosted audio content service 302 on which the audio fragment may be made available by the hosted audio content service 302. In some implementations, this metadata related to the audio fragments may be stored in a table, such as, for example, the table 318 illustrated in FIG. 3.

The audio fragments stored in the audio content store 316 may be sourced from different commercial content providers, such as, for example, record labels when the audio fragments are songs. Additionally or alternatively, the audio fragments stored in the audio content store 316 may be sourced from users of the hosted audio content service 302. For example, the audio content service 302 may be configured to enable portable electronic devices 304(a)-304(n) and desktop computers 306(a)-306(m) to upload audio fragments to the hosted audio content service 302 over network 308. These crowd-sourced audio fragments may be audio fragments that were stored at (or otherwise available to) the portable electronic devices 304(a)-304(n) and desktop computers 306(a)-306(m) and/or these crowd-sourced audio fragments may be audio fragments that users of the hosted audio content service 302 recorded and uploaded to the hosted audio content service using individual ones of the portable electronic devices 304(a)-304(n) and desktop computers 306(a)-306(m).

The channels provided by the hosted audio content service 302 may include a set list of channels designated by the hosted audio content service 302. In some implementations, the hosted audio content service 302 may create different channels and specify certain criteria to be satisfied by audio fragments in order to be tagged as belonging to each channel. For example, the hosted audio service 302 may create channels that are related to, for example, certain genres of music, different time periods, particular artists, specific geographic locations, etc., and specify criteria to be satisfied by audio fragments in order to be tagged as belonging to these individual channels. Then, as new audio fragments are added to the audio content store 316, the new fragments may be tagged as belonging to those channels for which they satisfy the criteria specified by the hosted audio content service 302.

When the hosted audio content service 302 sources audio fragments from commercial content providers, channel tags associated with the audio fragments may be determined based on information supplied by the commercial content providers in connection with providing the audio fragments and/or other metadata related to the audio fragments. Additionally or alternatively, channel tags associated with audio fragments, whether sourced from commercial content providers or from users of the hosted audio content service 302, may be supplied by an editorial staff of the hosted audio content service 302.

In addition or as an alternative to channels designated and defined by the hosted audio content service 302, the channels offered by the hosted audio content service 302 may include channels created and defined by users of the hosted audio content service 302. When the hosted audio content service 302 receives audio fragments from individual users of the hosted audio content service 302, the channel tag(s) associated with the individual audio fragments that are stored in connection with the audio fragments in the audio content store 316 may be provided by the users who supplied the audio fragments. For example, a user who records his/her own audio fragments and uploads these audio fragments to the hosted audio content service 302 may specify that these audio fragments are to be associated with one or more channels that correspond to content supplied by the user. Furthermore, in some implementations, the hosted audio content service 302 may limit access to channels corresponding to content supplied by the user to other users of the hosted audio content service 302 designated by the user. Specifically, the user may specify a roster of other users of the hosted audio content service 302 who are allowed to access these channels and/or access may be limited to users of the hosted audio content service 302 who belong to the users social network.

It will be appreciated that individual audio fragments may be associated with one or more different channels provided by the hosted audio content service 302.

Hosted audio content service 302 also is configured to receive, from electronic user devices, such as, for example, portable electronic devices 304(a)-304(n) and desktop computers 306(a)-306(m), designations of different geographic locations that users of the hosted audio content service 302 perceive as being related to individual audio fragments stored in audio content store 316. Hosted audio content service 302 then stores these crowd-sourced location designations as location tags associated with their corresponding audio fragments in audio content store 316. It will be appreciated that individual audio fragments may be associated with one or more different location tags.

Hosted audio content service 302 may support one or more different formats of location tags that specify locations at different levels of granularity. For example, in some implementations, the location tags may be specific geographic coordinates (e.g., latitude and longitude coordinates). Additionally or alternatively, the location tags may be specified at the street address-level, the zip-code level, the municipality-level, the state-level, the country-level, etc.

In some implementations, in addition to receiving designations of different locations to which individual audio fragments are perceived as being related from users of the hosted audio content service 302, hosted audio content service 302 may be configured to receive indications of how strongly users of the hosted audio content service 302 perceive individual audio fragments as being related to the different locations. For example, when a user of the hosted audio content service 302 tags an audio fragment as being related to a location, the hosted audio content service 302 also may enable the user to specify a numeric weight (e.g., a value on a scale from 1-10 or from 1-100) reflective of how strongly the user perceives the audio fragment as being related to the location. The hosted audio content service 302 then may calculate a measure of how strongly an audio fragment is related to a particular location to which it is tagged by averaging the weights specified by the users who tagged the audio fragment as being related to the particular location. Additionally or alternatively, the hosted audio content service 302 may calculate a measure of how strongly an audio fragment is related to a particular location based on the number of different users of the hosted audio content service 302 who tagged the audio fragment as being related to the particular location. Such measures of how strongly audio fragments are related to different locations then may be stored within the audio content store 316, and the hosted audio content service 302 may consider these measures of how strongly audio fragments are related to different locations when selecting audio fragments for different electronic user devices.

Hosted audio service 302 also is configured to receive requests from individual electronic user devices, such as, for example, portable electronic user devices 304(a)-304(n) and desktop computers 306(a)-306(m), for audio fragments for playback at the electronic user devices. In response to such a request, the hosted audio service 302 is configured to determine either a current physical or virtual location for the requesting electronic user device and to transmit one or more audio fragments to the requesting electronic user device that other users have designated as being related to the current physical or virtual location of the electronic user device.

Specifically, the hosted audio service 302 may determine to which of the channels offered by the hosted audio service 302 the requesting electronic user device subscribes. The channel(s) to which the requesting electronic user device subscribes may be specified along with the request from the electronic user device for audio fragments for playback at the electronic user device. Alternatively, the channel(s) to which the requesting electronic user device subscribes may have been specified previously, or the hosted audio service 302 may decide which channel(s) the requesting electronic user device subscribes to on its own.

The hosted audio content service 302 then may filter the songs stored in the audio content store 316 by channel tags such that the hosted audio content service 302 considers only songs tagged as corresponding to the channels to which the requesting user device subscribes when selecting audio fragments to deliver to the requesting electronic user device. Thereafter, the hosted audio content service 302 identifies audio fragments from among the audio fragments tagged as corresponding to the channels to which the requesting electronic user device is subscribing that other users have tagged as corresponding to the physical or virtual location of the requesting electronic user device and transmits one or more of these audio fragments to the requesting electronic user device for playback at the requesting electronic user device.

The hosted audio content service 302 may employ different technologies in order to transmit the one or more audio fragments to the requesting electronic user device. For example, in some implementations, the hosted audio content service 302 may stream the one or more audio fragments to the requesting electronic user device.

Figure 4:
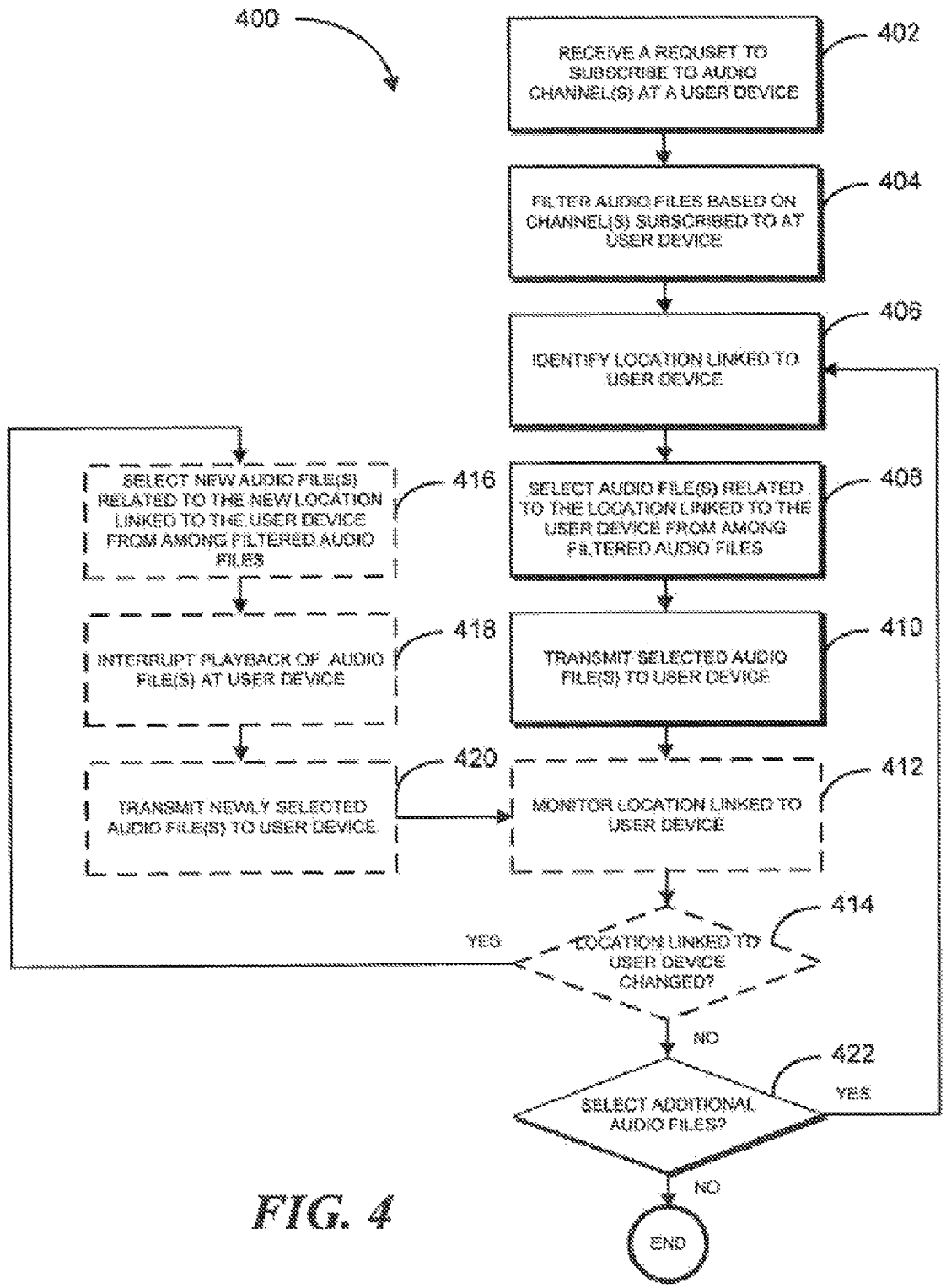
FIG. 4 is a flowchart of an example of a process for providing location-indexed audio content to an electronic device.

FIG. 4 is a flowchart 400 of an example of a process for providing location-indexed audio content to an electronic device. The process illustrated in the flowchart 400 of FIG. 4 may be performed by a hosted audio content service such as the hosted audio content service 302 illustrated in FIG. 3. More specifically, the process illustrated in the flowchart 400 of FIG. 4 may be performed by one or more of the processors 312 of the computing device(s) that implement the hosted audio content service 302 as a consequence of executing instructions stored on computer-readable storage media accessible to the hosted audio content service 302.

The process begins when the hosted audio content service receives a request to subscribe to one or more audio channels provided by the hosted audio content service at a user device (402). This request may be received from the user device itself. Alternatively, the request may be received from a different user device. For example, a user of the hosted audio content service may use a desktop computer to transmit a request to the hosted audio content service to subscribe to one or more audio channels offered by the hosted audio content service at a different portable electronic device.

After receiving the request to subscribe to the channel(s) provided by the hosted audio content service at the user device, the hosted audio content service filters the audio fifes available to the hosted audio content service based on the channel(s) subscribed to at the user device (404).

The hosted audio content service also identifies a location presently linked to the user device (406). For example, the hosted audio content service may identify a current physical location or a currant virtual location of the user device. In some cases, information that is indicative of the current physical or virtual location of the user device may be received by the hosted audio content service from the user device itself. Alternatively, in other cases, the hosted audio content service may determine the current physical or virtual location of the user device itself without having received information that is indicative of the physical or virtual location of the user device from the user device itself.

After identifying the location linked to the user device, the hosted audio content service selects from among the filtered audio files one or more audio files that other users of the hosted audio content service have designated as being related to the location linked to the user device (408). In some implementations, the hosted audio content service may select only a single audio file. In other implementations, the hosted audio content service may select multiple audio files that other users of the hosted audio content service have designated as being related to the location linked to the user device.

In some implementations, the individual audio files that are available to the hosted audio content service are associated with corresponding geographic location tags that specify locations that other users of the hosted audio content service have designated as being related to the individual audio files. These geographic location tags may specify these locations at varying levels of granularity. For example, a geographic location tag may specify the geographic location with which an audio file is associated as geographic coordinates (e.g., latitude and longitude coordinates). Alternatively, a geographic location tag may specify an audio file as being related to a street address, a zip code, a municipality, a state, or a country, etc. In addition, to specifying a geographic location with which an audio file is associated, a geographic location tag also may specify a relevance radius indicating that that the audio file should be considered as being related to any other location within the relevance radius of the geographic location specified by the geographic location tag. For example, if the geographic location tag specifies that an audio file is related to certain geographic coordinates and that the relevance radius for the audio file is 10 miles, the hosted audio content service may consider the audio file as being related to any location that is within 10 miles of the geographic coordinates specified by the geographic location tag. Alternatively, if the geographic location tag specifies that an audio file is related to a particular zip code or municipality and that the relevance radius for the audio file is 10 miles, the hosted audio content service may consider the audio file as being related to any location that is within 10 miles of the boundary of the zip code or the boundary of the municipality, respectively.

As part of selecting one or more audio files that other users of the hosted audio content service have designated as being related to the location linked to the user device, the hosted audio content service may compare the identified location linked to the user device to locations specified within geographic location tags to identify audio files that are designated as being related to the location linked to the user device and/or audio files that are designated as being related to a location that is within an acceptable distance (e.g., a specified relevance radius) of the location linked to the user device.

Furthermore, in situations in which the hosted audio content service identifies multiple different audio files as being related to the location linked to the user device, the hosted audio content service may apply various different ranking heuristics in order to determine which of the audio files the hosted audio content service should select for transmission to the user device. As discussed above, in some implementations, the hosted audio content service may calculate measures of how strongly related audio files are to certain locations. In such implementations, the hosted audio content service may use the measures of how strongly related audio files are to the location linked to the user device in determining which audio files to select for the user device. For example, audio files that are perceived as being relatively strongly related to the location linked to the user device may be selected before audio files that are perceived as being relatively weakly related to the location linked to the user device. As also discussed above, the hosted audio content service also may maintain measures of the popularity of different audio files, in some cases based, at least in part, on feedback received from users of the hosted audio content service. In such implementations, the hosted audio content service may use the measures of the popularity of different audio files in determining which audio files to select for the user device. For example, audio files that are perceived as being relatively popular may be selected before audio files that are perceived as being relatively unpopular. Furthermore, the hosted audio content service also may consult preference information for the user of the user device in determining which audio files to select far the user device.

After selecting one or more audio files that other users of the hosted audio content service have designated as being related to the location linked to the user device, the hosted audio content service transmits the selected audio file(s) to the user device for playback (410).

In some implementations, the hosted audio service continues to monitor the location linked to the user device while the user device plays back the selected audio files that the hosted audio service transmitted to the user device (412). In other implementations, the hosted audio content service may defer further consideration of the location linked to the user device until such time as it is deemed appropriate to select additional audio files for the user device.

In implementations in which the hosted audio service continues to monitor the location linked to the user device while the user device plays back the selected audio files, the hosted audio content service intermittently (e.g., periodically, randomly, or in response to some triggering event) may check to determine whether the location finked to the user device has changed (414). If the hosted audio content service determines that the location linked to the user device has changed during playback of the selected audio files, the hosted audio service selects one or more new audio files related to the new location linked to the user device from among the filtered audio channels (416). In addition, the hosted audio content service interrupts the playback of the audio files at the user device (418) and transmits to the user device the newly selected audio file(s) for the new location linked to the user device (420). In some implementations, the hosted audio content service may take steps to make the interruption of the playback of the audio files at the user device as seamless as possible. For example, in some implementations, the hosted audio content service may delay the interruption until a natural break in the audio files. Alternatively, the hosted audio content service may cause the playback of the audio files at the user device to gradually fade out and thereafter cause a gradual fade in of the playback of the new audio files.

In the event that the location linked to the user device does not change during playback of the selected audio files or in implementations in which the hosted audio content service does not monitor the location linked to the user device during playback of the selected audio files, the hosted audio content service determines, at an appropriate time, whether additional audio fries should be selected for transmission to the user device for playback at the user device (422). For example, the hosted audio content service may determine whether additional audio files should be selected some predetermined amount of time before the conclusion of the playback of the audio files at the user device. Alternatively, the hosted audio content service may determine that additional audio files should be selected in response to an explicit request from the user device for additional audio files.

If the hosted audio content service determines that additional audio files should not be selected, the process ends. Alternatively, in response to determining that additional audio files should be selected for the user device, the hosted audio content service identifies the current location linked to the user device (406) (e.g., either the same location or a new location) and proceeds through the process of selecting and transmitting appropriate audio files to the user device based on the current location linked to the user device as described above.

Figure 5:
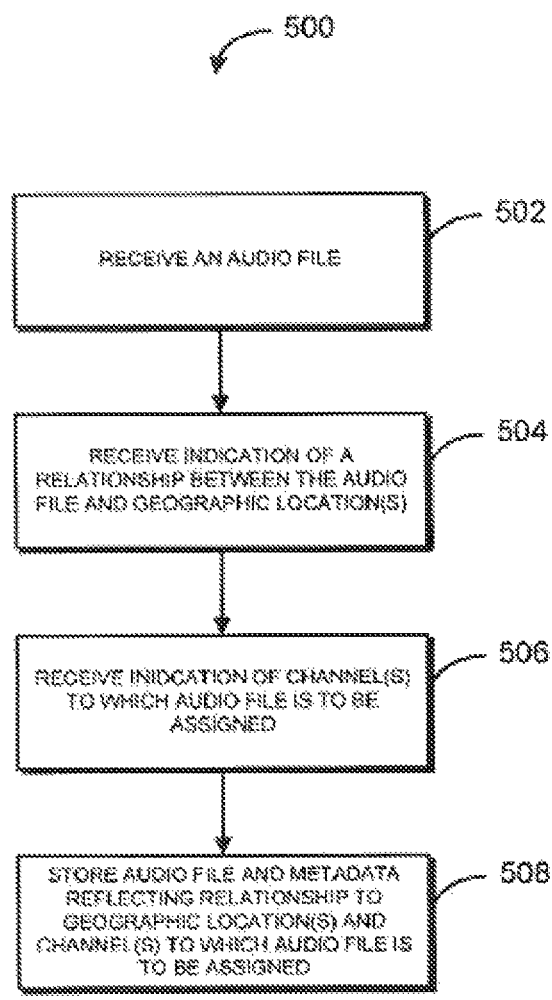
FIG. 5 is a flowchart of an example of a process for indexing and storing received audio content.

FIG. 5 is a flowchart 500 of an example of a process for indexing and storing received audio content. The process illustrated in the flowchart 500 of FIG. 5 may be performed by a hosted audio content service such as the hosted audio content service 302 illustrated in FIG. 3. More specifically, the process illustrated in the flowchart 500 of FIG. 5 may be performed by one or more of the processors 312 of the computing device(s) that implement the hosted audio content service 302 as a consequence of executing instructions stored on computer-readable storage media accessible to the hosted audio content service 302.

The process begins when an audio file is received by the hosted audio content service (502). As described above, an audio fife may be received from a user device. For example, the hosted audio content service may receive an audio file that was recorded by a user of the hosted audio service using a user device through which the user of the hosted audio content service accesses the hosted audio content service. Alternatively, an audio file may be received from a commercial content provider.

In addition to receiving the audio file, the hosted audio content service also may receive an indication of a relationship between the audio file and one or more geographic locations (504). For example, in the case of an audio file received from a user device that was recorded by a user of the hosted audio content service using the user device, the received indication of the relationship between the audio file and a geographic location may specify the location at which the audio file was recorded as the geographic location to which the audio file is related.

The hosted audio content service also receives an indication of one or more channels to which the received audio file is to be assigned (506). For example, in the case of an audio file received from a user of the hosted audio content service via a user device, the indication of the channel(s) to which the received audio file is to be assigned may specify one or more channels that were created and that are controlled by the user as the channel(s) to which the received audio file is to be assigned.

After receiving the audio file, the indication of the relationship between the audio file and one or more geographic locations, and the indication of the channel(s) to which the audio file is to be assigned, the hosted audio content service stores the audio file and corresponding metadata reflecting the relationship between the audio file and the geographic location(s) and the channel(s) to which the audio file is to be assigned. Thereafter, the hosted audio content service may use this metadata in determining whether to transmit the received audio file to other user devices.

A number of methods, techniques, systems, and apparatuses have been described. The described methods, techniques, systems, and apparatuses may be implemented in digital electronic circuitry or computer hardware, for example, by executing instructions stored in computer-readable storage media.

Apparatuses implementing these techniques may include appropriate input and output devices, a computer processor, and/or a tangible computer-readable storage medium storing instructions for execution by a processor.

A process implementing techniques described herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order, in some implementations, individual operations may be rearranged in a different order and/or eliminated and the desired results still may be achieved. Similarly, components in the disclosed systems may be combined in a different manner and/or replaced or supplemented by other components and the desired results still may be achieved.

A number of implementations and features have been described. Nevertheless, it will be understood that various modifications may be made for example, although the location tags described in connection with the disclosed audio content services generally are described as being crowd-sourced, location tags additionally or alternatively may be supplied by commercial content providers who contribute audio content to the audio content services.

Furthermore, although the above-described audio content services are described generally in connection with providing audio content that is relevant to a geographic location, these services may be equally well suited for providing audio content that is related to specific content that is being accessed by an electronic user device. For example, a hosted audio content service may enable web pages to be tagged (e.g., by users) as being related to different audio fragments such that, when users use electronic devices to browse to certain web pages, the hosted audio content service enhances the web browsing experience by causing audio fragments tagged as being related to the web pages to be played at the electronic devices. Alternatively, a hosted audio content service may enable portions of electronic documents to be tagged (e.g., by users) as being related to different audio fragments such that, when users use electronic devices to read the electronic documents the, hosted audio content service enhances the reading experience by causing audio fragments tagged as being related to the sections of the documents to be played at the electronic devices. For example, a hosted audio content service may enable pages of an electronic book to be tagged as being related to different audio fragments such that when users use electronic device to read the electronic book, the hosted audio content service enhances the reading experience by causing audio fragments tagged as being related to the pages of the book to be played at the electronic devices.

Moreover, the hosted audio content services described herein may be adapted for use in a number of different settings. In one example, the hosted audio content services may be adapted for use with automobiles. For example, electronic devices that are configured to be able to communicate with a hosted audio content service may be incorporated within automobiles to augment driving experiences with recreated ambient sounds from the outside (e.g., anticipating a beach destination with sounds of the sea), recreated ambient sounds from a historical event that occurred along the route being traveled (e.g., gun and canon fire when traveling past a battlefield), and/or informational content about points of interest along the route being traveled (e.g., information about a nearby city, village, or landmark).

In a second example, the hosted audio content services may be leveraged to provide travel information to tourists. For instance, travel guide businesses could contribute audio content (e.g., audio notes or podcasts) and flag this content as being related to specific geographic locations such that the hosted audio content services deliver appropriate travel information to users based on their locations. In particular, the hosted audio content services may be leveraged to provide a guided walk around a historic city center or to present a tourist with information about recommended restaurants, hotels or points of interest nearby.

In a third example, the hosted audio content services may enable users to create an audio diary of location-based posts to which friends and other users can subscribe.

In a fourth example, the hosted audio content services may be leveraged to provide pubic audio notice boards. In particular, the hosted audio content services may enable users to contribute audio content to a public channel that serves as a public audio notice board, providing information about local events, venues, promotions, news, etc.

In view of the modifications that may be made to the above-described implementations and features, other implementations and features are within the scope of the following claims.

What is claimed is:

1. A method for making electronic audio content available at an electronic device, the method comprising:
    storing, in a computer memory storage system, associations between individual pieces of electronic audio content and corresponding geographic locations;
    storing, in the computer memory storage system, a record of an assignment of each of the individual pieces of electronic audio content to at least one collection of electronic audio content from among multiple different collections of electronic audio content;
    receiving a request to subscribe to one or more specific ones of the collections of electronic audio content, the request to subscribe to the one or more specific collections of electronic audio content being associated with an electronic device;
    receiving an indication of a present link between the electronic device and a particular geographic location;
    based on the stored associations between the individual pieces of electronic audio content and the stored records of the assignments of the individual pieces of electronic audio content to the collections of electronic audio content, identifying a particular piece of electronic audio content as being assigned to one of the one or more specific collections of electronic audio content and as being related to the particular geographic location; and
    transmitting the identified piece of electronic audio content to the electronic device, wherein the identified piece of electronic audio content is played by the electronic device.

2. The method of claim 1 wherein receiving an indication of a present link between the electronic device and a particular geographic location includes receiving an indication that the electronic device presently is accessing electronic content that is relevant to the particular geographic location.

3. The method of claim 2 wherein receiving an indication that the electronic device presently is accessing electronic content is relevant to the particular geographic location includes receiving an indication that the electronic device presently is accessing one or more images of the particular geographic location.

4. The method of claim 3 wherein receiving an indication that the electronic device presently is accessing one or more images of the particular geographic location includes receiving an indication that the electronic device presently is accessing one or more images of the particular geographic location that are made available to the electronic device by a web site.

5. The method of claim 1 wherein:
    the electronic device is a portable electronic device; and
    receiving an indication of a present link between the electronic device and a particular geographic location includes receiving an indication that the electronic device presently is located at the geographic location.

6. The method of claim 5 wherein receiving the indication that the electronic device presently is located at the geographic location includes receiving geolocation information provided by the electronic device indicating that the electronic device presently is located at the geographic location.

7. The method of claim 1 further comprising:
    receiving, from other electronic devices and for at least some of the pieces of electronic audio content, indications of corresponding geographic locations with which at least some of the pieces of electronic audio content are associated;
    wherein storing the associations between individual pieces of electronic audio content and corresponding geographic locations includes:
        responsive to receiving the indications of the corresponding geographic locations with which at least some of the pieces of electronic audio content are associated, storing the received indications of the corresponding geographic locations with which at least some of the pieces of the electronic audio content are associated.

8. The method of claim 7 wherein receiving, from the other electronic devices, the indications of the corresponding geographic locations with which at least some of the pieces of electronic audio content are associated includes receiving, from a particular one of the other electronic devices, geolocation information provided by the particular other electronic device and specifying a corresponding geographic location at which the particular other electronic device was located when the particular other electronic device accessed an individual one of the pieces of electronic audio content.

9. The method of claim 7 further comprising:
    receiving, from a particular one of the other electronic devices, a specific piece of electronic audio content recorded by the particular other electronic device; and
    storing the piece of electronic audio content recorded by the particular other electronic device, wherein receiving, from the other electronic devices, the indications of the corresponding geographic locations with which at least some of the pieces of electronic content are associated includes receiving, from the particular other electronic device, geolocation information provided by the particular other electronic device and specifying a corresponding geographic location at which the particular other electronic device was located when the particular other electronic device recorded the specific piece of electronic audio content.

10. The method of claim 1 wherein:
    storing, in the computer memory storage system, a record of an assignment of each of the individual pieces of electronic audio content to at least one collection of electronic audio content from among multiple different collections of electronic audio content includes storing, for each of a set of the pieces of electronic audio content, a record of an assignment to a collection of electronic audio content that is related to a first user identifier corresponding to a first user;
    receiving a request to subscribe to one or more specific ones of the collections of electronic audio content includes:
        receiving a request to subscribe to the collection of electronic audio content that is related to the first user identifier, the request to subscribe to the collection of electronic audio content being associated with a second user identifier corresponding to a second user, determining that the second user identifier is related to the first user identifier in a social network, and
        based on having determined that the second user identifier is related to the first user identified in the social network, granting the request to subscribe to the collection of electronic audio content that is related to the first user identifier;
    identifying a particular piece of electronic audio content as being assigned to one of the one or more specific collections of electronic audio content and being related to the particular geographic location includes identifying a particular piece of electronic audio content as being assigned to the collection of electronic audio content that is related to the first user identifier and being related to the particular geographic location; and making the identified piece of electronic audio content available to the electronic device includes making the identified piece of electronic audio content available to the electronic device as a consequence of having granted the request to subscribe to the collection of electronic audio content that is related to the first user identifier.

11. The method of claim 1 wherein making the identified piece of electronic audio content available to the electronic device includes streaming the identified piece of electronic audio content to the electronic device.

12. The method of claim 11 further comprising:
receiving, while streaming the identified piece of the electronic audio content to the electronic device, an indication of a new link between the electronic device and a new geographic location;
based on the stored associations between the individual pieces of electronic audio content and the stored records of the assignments of the individual pieces of electronic audio content to the collections of electronic audio content, identifying a new piece of electronic audio content as being assigned to one of the one or more specific collections of electronic audio content and being related to the new geographic location;
terminating the streaming of the identified piece of the electronic audio content to the electronic device; and
initiating streaming of the new piece of electronic audio content to the electronic device.

13. The method of claim 1 wherein:
receiving a request to subscribe to one or more specific ones of the collections of electronic audio content includes receiving a request to subscribe to two or more specific collections of electronic audio content; and
identifying a particular piece of electronic audio content as being assigned to one of the one or more specific collections of electronic audio content and being related to the particular geographic location includes:
identifying a set of pieces of electronic audio content that are related to the particular geographic location and assigned to at least one of the two or more specific collections of electronic audio content,
applying ranking heuristics to the set of pieces of electronic audio content, and
selecting the particular piece of electronic audio content based on results of applying the ranking heuristics to the set of pieces of electronic audio content.

14. A system for distributing electronic audio content, the system comprising:
one or more hardware processing elements; and
a computer memory storage sub-system device storing:
associations between individual pieces of electronic audio content and corresponding geographic locations;
assignments of each of the individual pieces of electronic audio content to at least one collection of electronic audio content from among multiple different collections of electronic audio content; and
instructions that, when executed by the one or more hardware processing elements, cause the one or more hardware processing elements to:
enable electronic devices to subscribe to one or more of the collections of electronic audio content,
monitor the electronic devices, based on monitoring the electronic devices, detect links between individual electronic devices and different geographic locations,
based on the stored associations between the individual pieces of electronic audio content and the stored records of the assignments of the individual pieces of electronic audio content to the collections of electronic audio content, identify pieces of electronic audio content as being assigned to the collections of electronic audio content to which the individual electronic devices subscribe and being related to the geographic locations to which the individual electronic devices are linked, and
transmit at least one of the identified pieces of electronic audio content to at least one of the electronic devices associated with the at least one of the identified pieces of audio content, wherein the at least one of the identified pieces of electronic audio content is played by the at least one of the electronic devices.

15. A method for identifying electronic audio files to be made available at an electronic device based on other electronic content being accessed at the electronic device, the method comprising:
storing, in a computer memory storage system, information that records associations between geographic locations and electronic audio files and a record of an assignment of each of the electronic audio files to at least one collection of electronic audio content;
determining that a particular piece of electronic content being accessed by the electronic device is associated with a particular geographic location;
based on the stored information that records associations between geographic locations and electronic audio files, identifying an audio file as being associated with the particular geographic location; and
transmitting the identified audio file to the electronic device, wherein the identified audio file is played by the electronic device.

* * * * *